(12) United States Patent
Jin et al.

(10) Patent No.: US 8,494,254 B2
(45) Date of Patent: Jul. 23, 2013

(54) METHODS AND APPARATUS FOR IMAGE RECTIFICATION FOR STEREO DISPLAY

(75) Inventors: Hailin Jin, San Jose, CA (US); Jialue Fan, Evanston, IL (US)

(73) Assignee: Adobe Systems Incorporated, San Jose, CA (US)

( * ) Notice: Subject to any disclaimer, the term of this patent is extended or adjusted under 35 U.S.C. 154(b) by 233 days.

(21) Appl. No.: 12/954,135

(22) Filed: Nov. 24, 2010

(65) Prior Publication Data

US 2013/0129191 A1    May 23, 2013

Related U.S. Application Data

(60) Provisional application No. 61/378,659, filed on Aug. 31, 2010.

(51) Int. Cl.
*G06K 9/00* (2006.01)
(52) U.S. Cl.
USPC .......................................................... 382/154
(58) Field of Classification Search
USPC ..................... 382/154; 348/481–485; 345/419
See application file for complete search history.

(56) References Cited

U.S. PATENT DOCUMENTS

2005/0083248 A1* 4/2005 Biocca et al. ..................... 345/8
2012/0218393 A1* 8/2012 Fortin et al. ...................... 348/59

OTHER PUBLICATIONS (Wang, Yao, "Multi View Video Sequence Analysis, Compression, and Virtual Viewpoint Synthesis", Apr. 2000, IEEE transactions on Circuits and Systems for Video technology, vol. 10, No. 3).*
(Sarkis, Michel, "Towards real-Time Stereo using Non-Uniform Image Sampling and Sparse Dynamic Programming", Jun. 2008, Georgia Institute of Technology, Atlanta, GA, USA).*
R. I. Hartley, Theory and practice of projective rectification. IJCV, 1999, pp. 115-127.
A. Fusiello and L. Irsara. Quasi-euclidean uncalibrated epipolar rectification. In ICPR, 2008. pp. 1-7.
M.Lang, A.Hornug, O. Wang, S. Poulakos, A. Smolic, M.Gross. Nonlinear disparity mapping for stereoscopic 3D. In SIGGRAPH 2010. pp. 1-2.

* cited by examiner

*Primary Examiner* — Samir Ahmed
*Assistant Examiner* — Totam Le
(74) *Attorney, Agent, or Firm* — Wolfe-SBMC

(57) ABSTRACT

A set of features in a pair of images is associated to selected cells within a set of cells using a base mesh. Each image of the pair of images is divided using the base mesh to generate the set of cells. The set of features is defined in terms of the selected cells. A stereo image pair is generated by transforming the set of cells with a mesh-based transformation function. A transformation of the set of cells is computed by applying an energy minimization function to the set of cells. A selected transformed mesh and another transformed mesh are generated by applying the transformation of the set of cells to the base mesh. The mesh-based transformation function preserves selected properties of the set of features in the pair of images.

20 Claims, 12 Drawing Sheets

Left image 310　　Right image 314

Left image
1110
Right image
1114
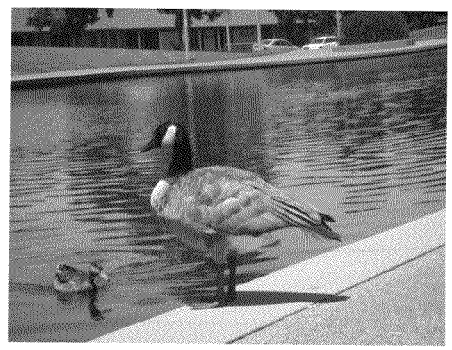
FIG. 11A
FIG. 11B

METHODS AND APPARATUS FOR IMAGE RECTIFICATION FOR STEREO DISPLAY

BACKGROUND

This application claims benefit of priority to U.S. Provisional Application Ser. No. 61/378,659, which was filed on Aug. 31, 2010.

DESCRIPTION OF THE RELATED ART

The recent popularity of three-dimensional (3D) display systems as a vehicle for the display of professionally-produced motion pictures and video games has resulted in a significant increase in demand for the ability to produce three-dimensional images for display in a wide variety of market segments.

Conventionally available methods for producing three-dimensional images depend on access to sophisticated camera equipment, such as stereo cameras or synchronized multiple-camera sets. Such stereo cameras or synchronized multiple-camera sets are capable of producing image data sets that are configured (through the spacing of separate lenses) for three-dimensional rendering and display. A three-dimensional visual effect results from the difference in the position of at least two lenses with respect to the subject of the photograph. The intensity of a three-dimensional visual effect typically increases in direct proportion to the distance between the lenses (the intra-axial distance).

A stereo camera is a type of camera with two or more lenses with a separate image sensor or film frame for each lens. Two images or more images are captured by such a camera. Access to such sophisticated camera equipment is limited by the cost of production. Additionally, the intensity of the three-dimensional effect is limited by the constraint placed on the inter-axial distance as a result of the desire for a small camera case form factor.

A similar effect is commonly achieved with multiple cameras, but the ability to achieve a satisfactory three-dimensional result with multiple cameras is limited by the complexity of correctly targeting the cameras on the same location and simultaneously capturing images in the two cameras. Like the stereo camera, specialized equipment is required. Additionally, however, a high level of photographic skill is needed to capture the image data sets.

SUMMARY

A set of features in a pair of images is associated to selected cells within a set of cells using a base mesh. Each image of the pair of images is divided using the base mesh to generate the set of cells. The set of features is defined in terms of the selected cells. A stereo image pair is generated by transforming the set of cells with a mesh-based transformation function. A transformation of the set of cells is computed by applying an energy minimization function to the set of cells. A selected transformed mesh and another transformed mesh are generated by applying the transformation of the set of cells to the base mesh. The mesh-based transformation function preserves selected properties of the set of features in the pair of images.

BRIEF DESCRIPTION OF THE DRAWINGS

FIGS. 11A-11B illustrate example results of image rectification for stereo display according to some embodiments.

Figure 1:
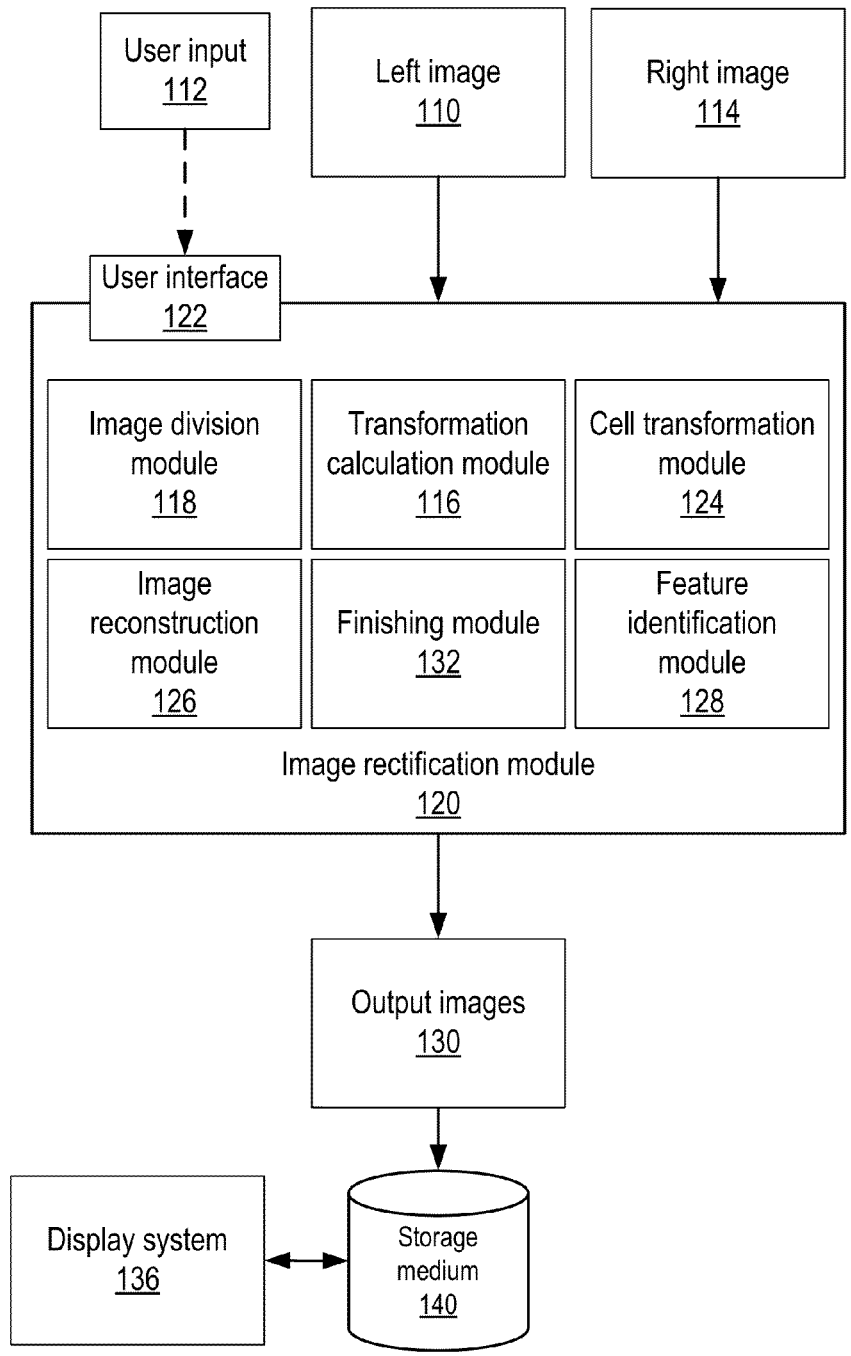
FIG. 1 illustrates a module that may be used to implement image rectification for stereo display according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Introduction to Image Rectification for Stereo Display

Various embodiments of methods and apparatus for image rectification for stereo display allow creation of a stereo image pair suitable for three-dimensional display from a selected pair of input images. A set of features in the pair of input images is identified and associated to a set of cells using a base mesh. The stereo image pair is generated by transforming the set of cells through a mesh-based transformation. The mesh-based transformation attempts to preserve selected properties of the features of the input image pair through the application of an energy minimization to a set of constraints defined in terms of the selected features.

In some embodiments, the selected pair of input images is a pair of two-dimensional images. The resulting stereo image pair is suitable for three-dimensional stereo display. The resulting image pair simulates the result available from a stereo camera or a pair of cameras synchronized at a known inter-axial distance for stereo image use. Generally speaking, the selected pair of images will be two-dimensional images of a single scene taken from different viewpoints. Such embodiments do not require that the spatial relationship between the camera or cameras generating the two input images be known. Likewise, such embodiments do not require that the two input images be captured simultaneously.

In one embodiment, the pair of images is divided into the set of cells by applying the base mesh to each image of the pair of input images. Selected features of the pair of input images are defined in terms of the cells using either an automated feature detection system or user-driven selection. A transformation of the base mesh is computed for each input image by applying an energy minimization function to constraints associated with the selected features of the pair of input images. A transformed mesh is generated for each input image by applying the transformations to the base mesh. Transformed images are generated by applying the pixels associated with each cell of the set of cells to the transformed meshes. A result image pair rectified for stereo display is generated from the transformed images by cropping or otherwise finishing the transformed images.

Figure 12:
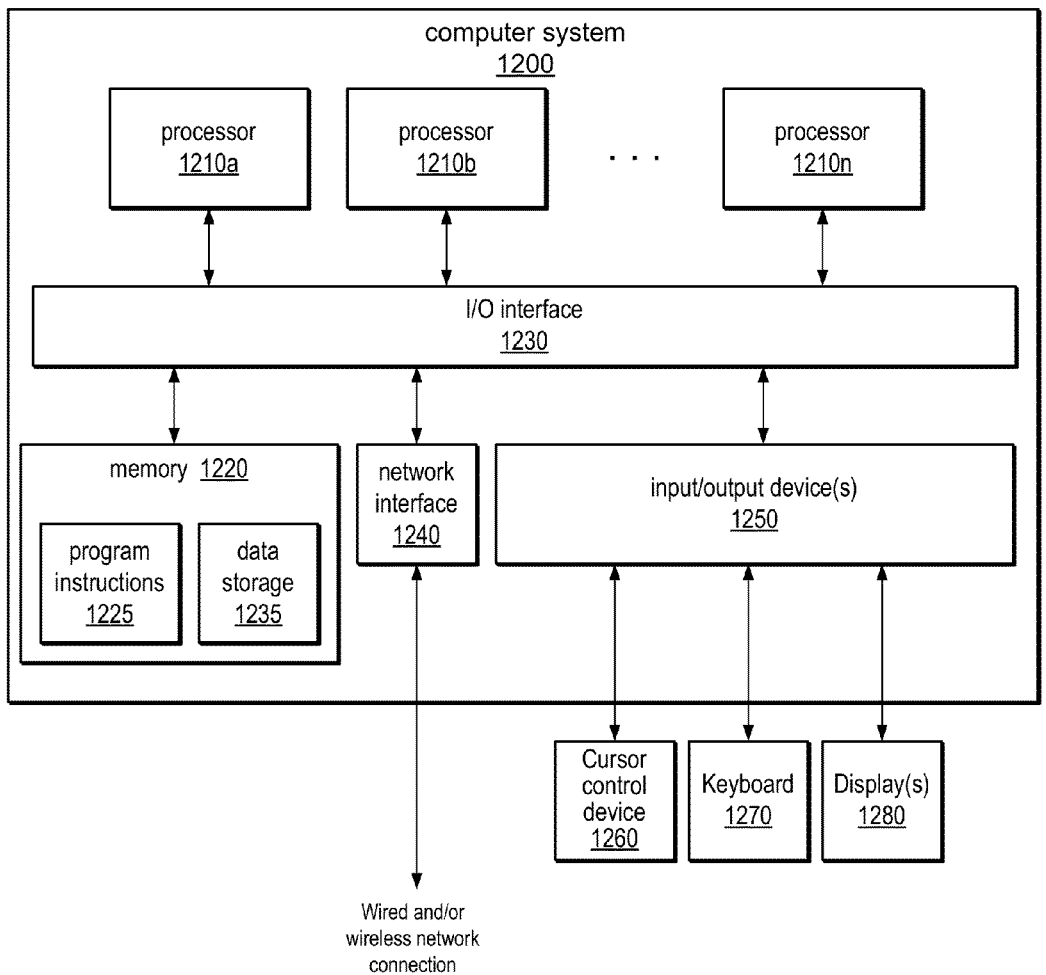
FIG. 12 depicts an example computer system that may be used in some embodiments.

With reference now to the figures, and in particular with reference to FIG. 1, a module that may be used to implement image rectification for stereo display according to some embodiments is illustrated. An image rectification module 120 may implement one or more of the techniques and tools for image rectification for stereo display illustrated in FIGS. 2 through 11. FIG. 12 depicts an example computer system on which embodiments of image rectification module 120 may be implemented. Image rectification module 120 receives as input one or more digital images, such as left image 110 and right image 114. While the pair of example input images described herein will be described throughout the following disclosure as left image 110 and right image 114, one skilled in the art will readily understand, in light of having read the present disclosure, that the spatial relationship between a pair of input images need not be explicitly known in order for the techniques and tools of the disclosed embodiments to be applicable to the pair of input images. An example input image pair that will be discussed below with respect to operations on left image 110 and right image 114 is discussed below with respect to FIG. 3.

Image rectification module 120 may receive through a user interface 122 user input 112 activating an image rectification tool for creating an image pair for stereo display. Image rectification module 120 transforms the left image 110 and right image 114 to generate output images 130, according to user input 112 received via user interface 122, which may include an image rectification editing tool. Image rectification module 120 generates as output one or more output images 130. Output images 130 may, for example, be stored to a storage medium 140, such as system memory, a disk drive, DVD, CD, etc. Output images 130 may be displayed on display system 136. In some embodiments, display system 136 is configured for stereo display.

In some embodiments, image rectification module 120 may provide a user interface 122 via which a user may interact with image rectification module 120, for example to activate an image rectification tool, to perform a selection of left image 110 and right image 114, and to perform feature selection as described herein. In some embodiments, user interface 122 may provide user interface elements whereby the user may select image rectification options including, but not limited to weighting of constraints and weighting of particular features of left image 110 and right image 114 or regions of left image 110 and right image 114. In some embodiments, the user interface may provide user interface elements whereby the user may specify which layers data is to be sampled from and/or painted to.

An image division module 118 applies a base mesh, such as the base mesh discussed below with respect to FIGS. 4A-4B to left image 110 and right image 114 and generates a set of cells from left image 110 and right image 114. The cells generated from left image 110 and right image 114 are associated with pixels from left image 110 and right image 114 that are contained within the boundaries of the cells as defined by application of the base mesh.

A feature identification module 128 facilitates recording of the location of features within and between cells of left image 110 and right image 114. In some embodiments, feature identification module 128 provides automatic identification of salient features. Such salient features can, in some embodiments, include points useful for defining shapes in left image 110 and right image 114. Likewise, such salient features can, in some embodiments, include line segments appearing in left image 110 and right image 114, as is discussed below with respect to FIGS. 6A-6B. Some of these line segments may be identified as defining features in left image 110 and right image 114, as is discussed below with respect to FIG. 7. Other such line segments may be identified as being horizontal or vertical in left image 110 and right image 114, as is discussed below with respect to FIG. 8. Additional line segments may be identified as being parallel between left image 110 and right image 114, as is discussed below with respect to FIGS. 9A-9B. In some embodiments, feature identification module 128 records selection of each of the above-referenced salient features as they are selected or indicated by a user through user interface 122.

A transformation calculation module 116 computes a transformation of the base mesh for left image 110 and a transformation of the base mesh for right image 114 by applying an energy minimization function to constraints associated with the selected features of left image 110 and right image 114. One example of such an energy minimization function is discussed with respect to FIGS. 4A-9B below.

A cell transformation module 124 generates a transformed mesh for each of left image 110 and right image 114 by applying the transformations calculated by transformation calculation module 116 to the base mesh. An image reconstruction module 126 applies the pixels of the cells from left image 110 and right image 114 to the transformed mesh for each of left image 110 and right image 114, respectively, to generate transformed images. A transformed mesh and the application of cell content are discussed below with respect to FIGS. 10A-10B. Likewise, a finishing module 132 performs any necessary image editing operations and adjustments required to ready transformed images created by image reconstruction module 126 for use in stereo display. An example of use of finishing module 132 to perform cropping of transformed images created by image reconstruction module 126 is discussed below with respect to FIGS. 11A-11B.

Figure 2:
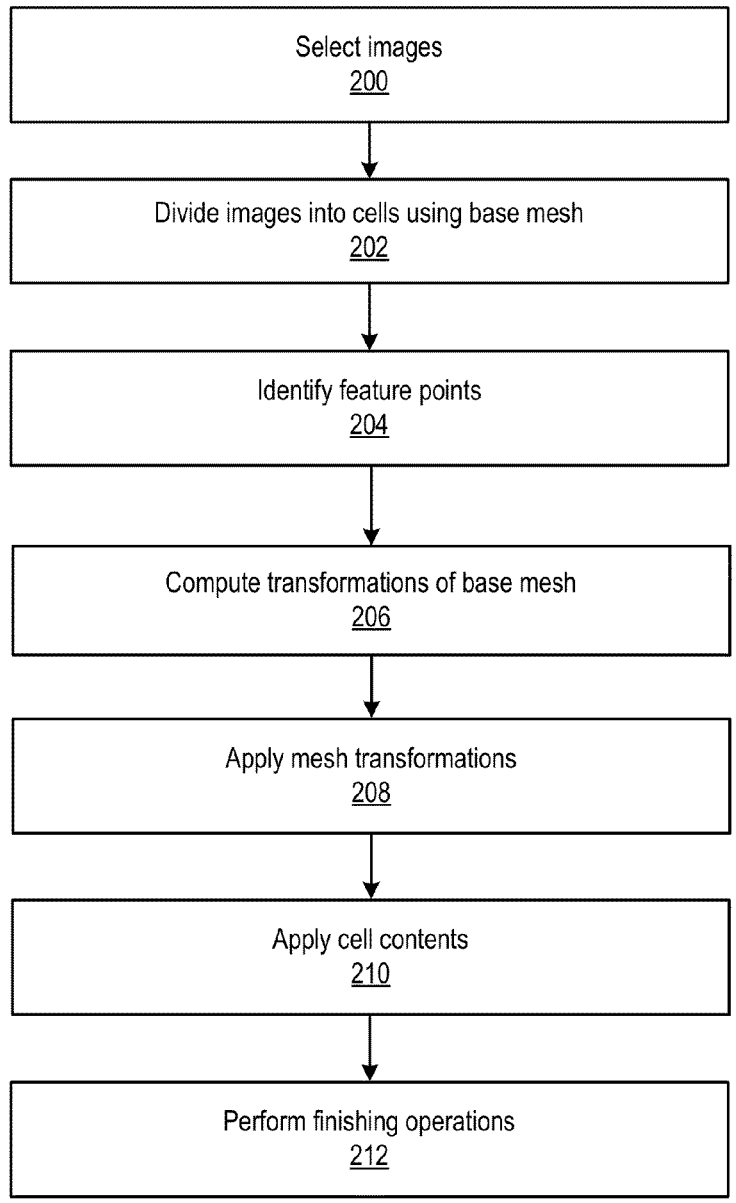
FIG. 2 depicts a high-level logical flowchart of a process for implementing image rectification for stereo display according to some embodiments.

FIG. 2 depicts a high-level logical flowchart of a process for implementing image rectification for stereo display according to some embodiments. A pair of images is selected for rectification for stereo display (200). Referring briefly to FIG. 1, left image 110 and right image 114 form such an image pair.

Returning to FIG. 2, the selected images are divided into cells using a base mesh (202). An example of such a base mesh is discussed below with respect to FIGS. 4A-4B, and the resulting configuration of cells is discussed below with respect to FIG. 5. The cells generated using the base mesh are associated with pixels from the respective images that are contained within the boundaries of the cells as defined by application of the base mesh.

Feature points are identified (204). Identifying feature points associates the feature points to particular cells. Such feature points are discussed below with respect to FIGS. 6A-9B. In some embodiments, these feature points include the locations of important shape-defining points in the image pair. Additionally, the feature points can include endpoints of straight line segments that the user desires to see preserved as straight line segments in resulting images. Other feature points can include horizontal or vertical line segments within an input image that the user desires to see preserved as horizontal or vertical line segments in a resulting image. Feature points may also include line segments within the two input images that are intended to remain parallel between the two resulting images. Feature points can define areas of special interest, such as a particular item or area of an image where distortion is to be minimized to a greater extent than may be possible in the remainder of the image.

In one embodiment, a set of features in a pair of images is associated to selected cells within a set of cells using a base mesh by the operations performed in block 202 and block 204. The associating includes dividing each image of the pair of images using the base mesh to generate the set of cells in block 202 and defining the set of features in terms of the selected cells by identifying feature points in block 204.

Transformations of the base mesh are computed for the cells of the input images (206) using an energy minimization function, which is discussed below with respect to FIGS. 6A-9B. The transformations computed for each of the input images are applied to the base mesh (208) to generate a transformed mesh for each input image. Such a transformed mesh is discussed below with respect to FIGS. 10A-10B. Cell contents are applied, in a manner analogous to texture mapping, to cells of each transformed mesh (210) to generate transformed images, which are also discussed below with respect to FIGS. 10A-10B.

In one embodiment, a stereo image pair is generated in blocks 206-210 by transforming each cell of the set of cells with a mesh-based transformation function. The operations for transforming the cells include computing a transformation of the set of cells by applying an energy minimization function to the cells (block 206), and generating a selected transformed mesh and another transformed mesh by applying the transformation of the set of cells to the base mesh in block 208. Cell content is then applied to the resulting meshes in block 210. The mesh-based transformation function preserves selected properties of the set of features in the pair of images.

Finishing operations, such as cropping, are then applied to each transformed image (212). An example of a finished image pair rectified for stereo display is discussed below with respect to FIGS. 11A-11B.

Figure 3A:
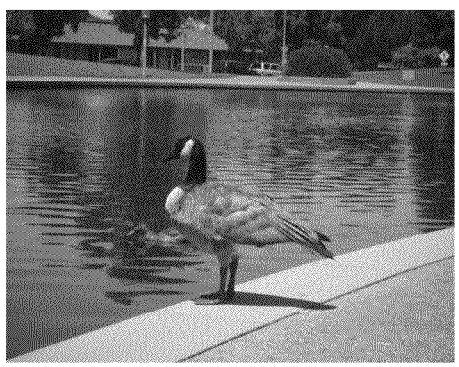
FIGS. 3A-3B illustrate inputs to a process for implementing image rectification for stereo display according to some embodiments.
Figure 3B:
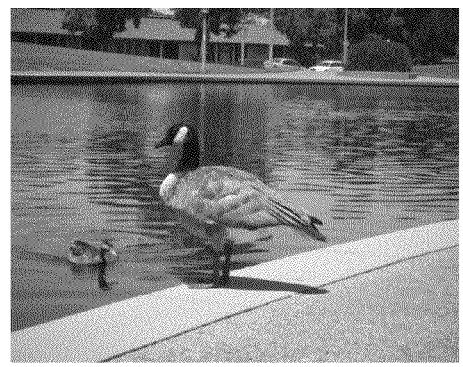

FIGS. 3A-3B illustrate inputs to a process for implementing image rectification for stereo display according to some embodiments. FIG. 3A depicts a left image 310. FIG. 3B depicts a right image 314. As will be apparent from study of left image 310 and right image 314, the two images were captured by a camera or cameras situated at different locations to capture the scene from different points of view. Embodiments provide techniques and tools for rectifying left image 310 and right image 314 for three-dimensional stereo display.

Figure 4A:
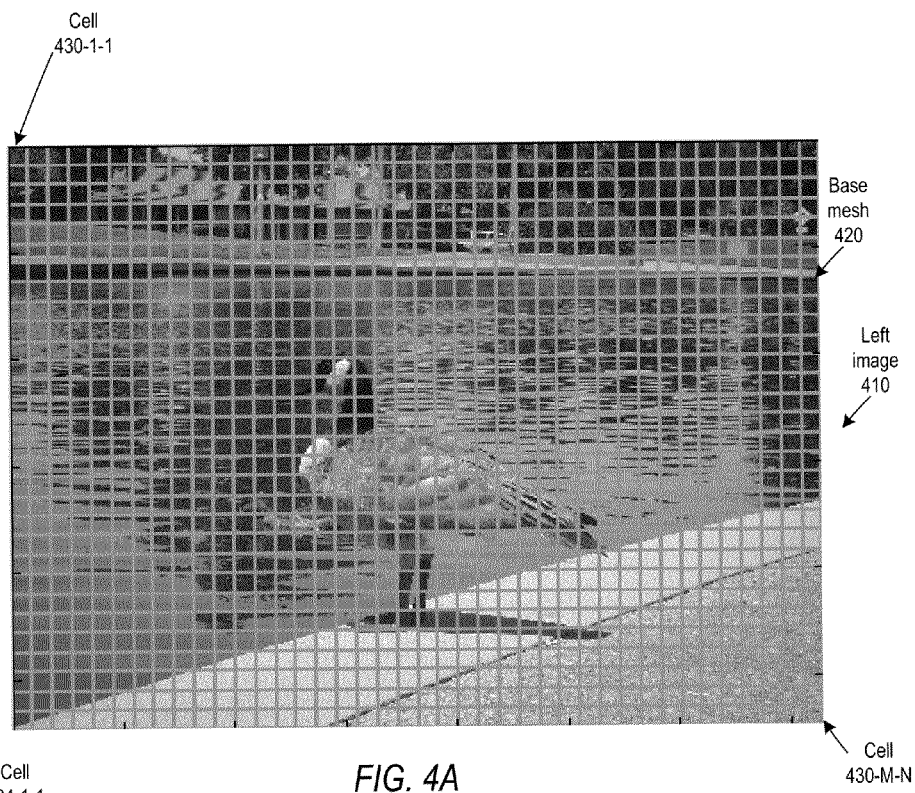
FIGS. 4A-4B depict assignment of a base mesh for use in transformations during a process for implementing image rectification for stereo display according to some embodiments.
Figure 4B:
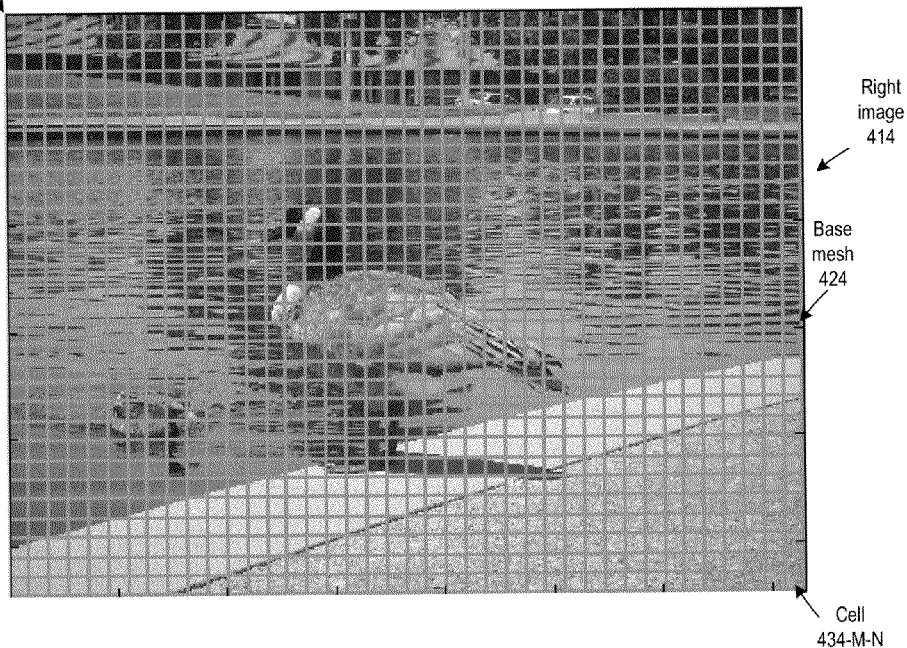

FIGS. 4A-4B depict assignment of a base mesh for use in transformations during a process for implementing image rectification for stereo display according to some embodiments. In FIG. 4A, left image 410 is divided into 1200 cells by a 30 cell×40 cell base mesh 420. Each of cells 430-1-1-430-M-N contains a group of pixels of content of left image 410. While 1200 square cells are portrayed in the embodiment depicted in FIG. 4A, one skilled in the art will realize that the number of cells used for rectifying a particular image pair will vary between embodiments, as will the shape of cells 430-1-1-430-M-N. In some embodiments, both the number and shape of cells 430-1-1-430-M-N will be user configurable or otherwise adaptable to the particular conditions of a given input image pair.

Similarly, in FIG. 4B, right image 414 is divided into 1200 cells by a by a 30 cell×40 cell base mesh 424. Each of cells 434-1-1-434-M-N contains a group of pixels of content of right image 414. In the embodiment depicted in FIGS.

4A-4B, base mesh 424 and base mesh 420 are identical instances of a single base mesh, containing the same number of cells of the same shape. One skilled in the art, however, will realize in light of having read the present disclosure that embodiments allow for the use of different base meshes with cells of different number and shape to accommodate input image pairs requiring such treatment.

Figure 5:
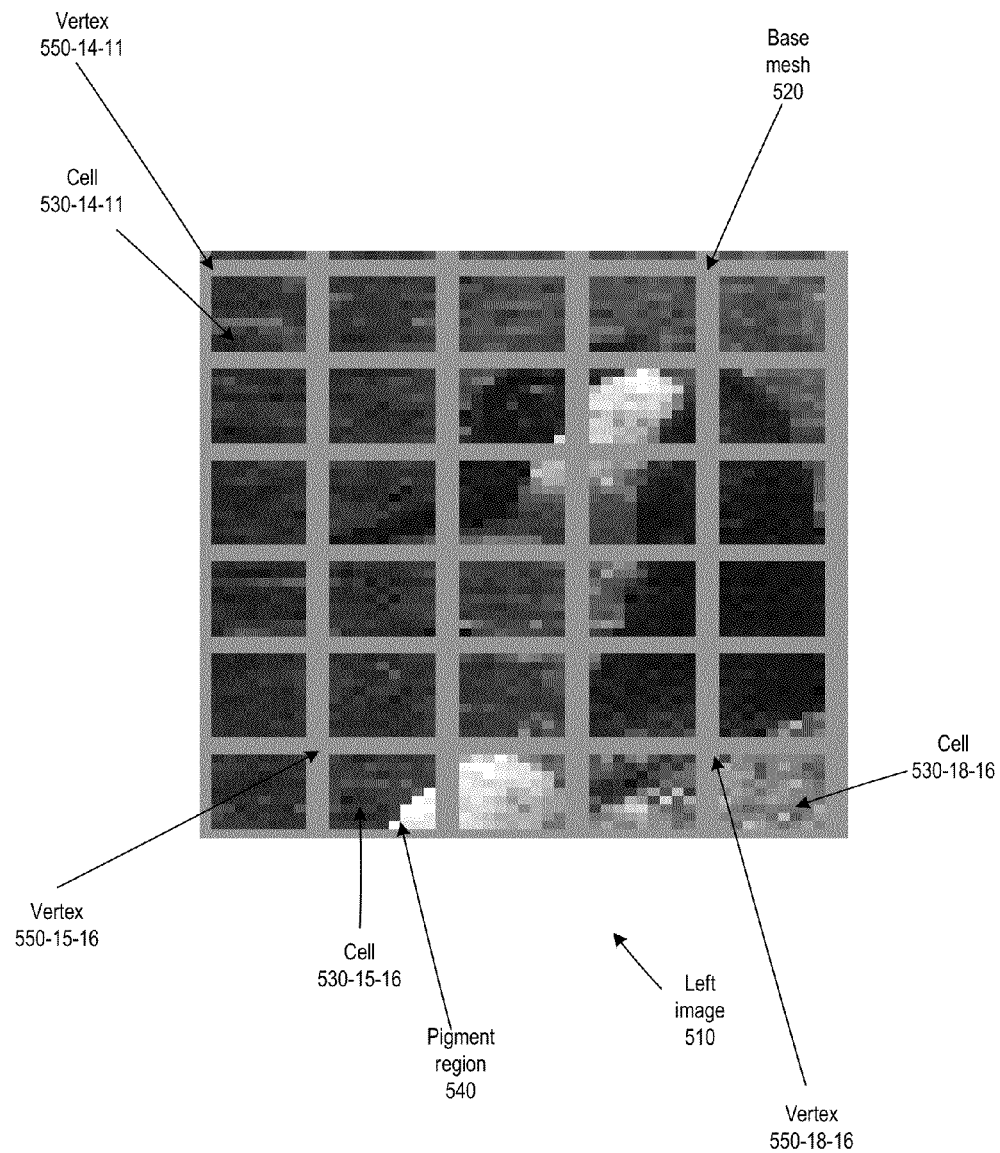
FIG. 5 illustrates details of a base mesh for use in transformations during a process for implementing image rectification for stereo display according to some embodiments.

FIG. 5 illustrates details of a base mesh for use in transformations during a process for implementing image rectification for stereo display according to some embodiments. As discussed above with respect to FIG. 4A, a left image 510 is presented with a base mesh 520 defining a group of cells 530-14-11-530-18-16. Each cell is defined by one of a group of vertices 550-14-11-550-18-16. Features, such as pigment region 540, are defined in terms of their location within the cell.

Constraints Supporting Image Rectification for Stereo Display

In order to rectify a pair of images for stereo display, such as left image 410 and right image 414 of FIGS. 4A-4B, embodiments calculate a rectifying transformation of base mesh 420 and base mesh 424, respectively, and transform base mesh 420 and base mesh 424 to generate an altered mesh for each of base mesh 420 and base mesh 424, to which the content of cells 430-1-1-430-$i$-$j$ and 434-1-1-430-$i$-$j$, respectively, are applied. The transform is of the form $$H = \begin{bmatrix} h1 & h2 & h3 \\ h4 & h5 & h6 \\ h7 & h8 & h9 \end{bmatrix}.$$

Vertices of the meshes are, as discussed below, denoted by $(u_{ij}, v_{ij})$ ($i=1, \ldots M$, $j=1, \ldots N$). Because there exists a bijective mapping between the vertexes of the meshes and the projective transform, embodiments compute the vertices of the meshes after transformation. Embodiments generate the calculation of the rectifying transformation as the solution to an energy minimization problem:

$$\{u_{ij}^*, v_{ij}^*\} = \arg \min_{u_{ij}, v_{ij}} E_c + E_s + E_e + E_d + E_a + E_x + E_l + E_h + E_p + E_n.$$

In some embodiments, a total of nine energy terms ($E_c$, $E_s$, $E_e$, $E_a$, $E_d$, $E_a$, $E_x$, $E_l$, $E_h$, $E_p$, and $E_n$) are employed and defined in terms of constraints related to left image 410 and right image 414 by base mesh 420 and base mesh 424, as discussed below. Other embodiments will use fewer energy terms, (e.g., using only $E_c$, $E_s$, and $E_e$).

Additionally, while the equation above indicates that each energy term is given equal additive weight, some embodiments will weight some terms more heavily than others (e.g., by multiplying a term, such as $E_c$ by a constant $k_c$ to increase or reduce its impact on the result relative to other terms). Weighting can also be adjusted for various parts of the image. In some embodiments, a user may designate parts of an image for which the weighting of particular terms, such as the shape preservation terms (e.g., $E_c$, and $E_e$, as discussed below) are given greater weight. As a further example, because the center region of an image is usually the region of greatest visual interest, the weights of each vertex or matching point (matching points are discussed below with respect to FIGS. 6A-6B) can be adjusted using a Gaussian kernel.

Figure 6A:
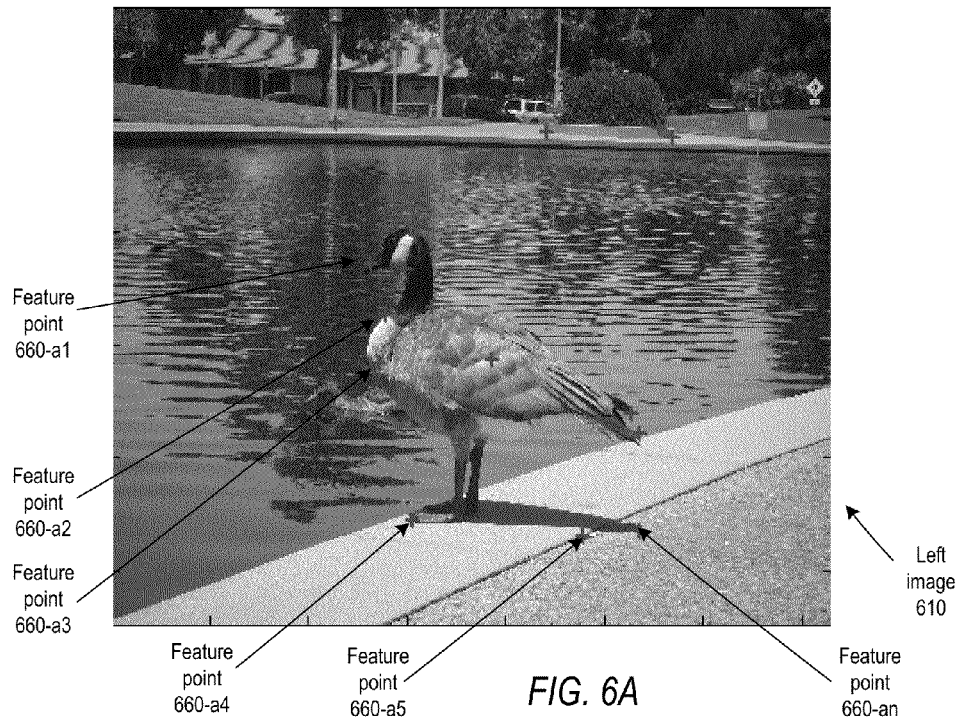
FIGS. 6A-6B depict results of an example of a feature recognition operation that can be used in the context of implementing image rectification for stereo display according to some embodiments.
Figure 6B:
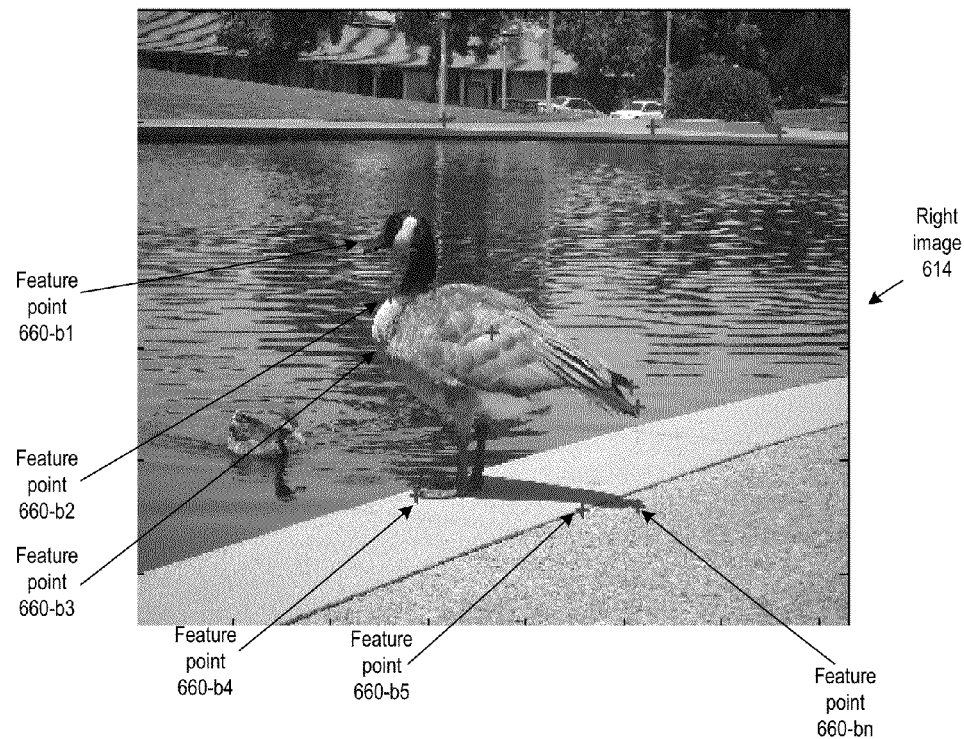

FIGS. 6A-6B depict results of an example of a feature recognition operation that can be used in the context of implementing image rectification for stereo display according to some embodiments. FIG. 6A depicts a left image 610 with feature points 660$a$1-660$an$. Similarly, FIG. 6B depicts a right image 614 with respective corresponding feature points 660$b$1-660$bn$. In some embodiments, feature points 660$a$1-660$an$ and feature points 660$b$1-660$bn$, as well as their respective correspondences, are selected or indicated by a user through a user interface. In some embodiments, feature points 660$a$1-660$an$ and feature points 660$b$1-660$bn$, as well as their respective correspondences, are automatically identified through the use of salient feature detection algorithms embodied within a feature identification module. Matching points can be detected using local salient point detectors such as SIFT.

Feature points 660$a$1-660$an$ and feature points 660$b$1-660$bn$, as well as their respective correspondences, are used by embodiments in calculating the energy terms $E_c$ and $E_s$, which relate to shape preservation. Because users prefer the visual effect created by transformations that appear to change smoothly and exhibit local similarity after transformation, shape preservation terms are used to reduce the appearance of distortion. Local similarity is related to the first derivative of the vertexes, which is reflected in the $E_c$ term, while smoothness is related to the second derivative of the vertexes, which are reflected in the $E_s$ term. $E_c$ is calculated using the equation:

$$E_c = \sum_{(i,j) \in V} ((v_{i+1,j} - v_{i,j}) \times \text{span}_y + (u_{i,j+1} - u_{i,j}) \times \text{span}_x)^2 +$$
$$\sum_{(i,j) \in V} ((u_{i+1,j} - u_{i,j}) \times \text{span}_y - (v_{i,j+1} - v_{i,j}) \times \text{span}_x)^2 +$$
$$\sum_{(i,j) \in V} ((v_{i,j+1} - v_{i+1,j+1}) \times \text{span}_y + (u_{i+1,j} - u_{i+1,j+1}) \times \text{span}_x)^2 +$$
$$\sum_{(i,j) \in V} ((u_{i,j+1} - u_{i+1,j+1}) \times \text{span}_y - (v_{i+1,j} - v_{i+1,j+1}) \times \text{span}_x)^2.$$

$E_s$ is calculated using the equation:

$$E_s = \sum_{(i,j) \in V} \left\| \begin{array}{c} u_{i,j+1} - 2u_{i,j} + u_{i,j-1} \\ v_{i,j+1} - 2v_{i,j} + v_{i,j-1} \\ u_{i+1,j} - 2u_{i,j} + u_{i-1,j} \\ v_{i+1,j} - 2v_{i,j} + v_{i-1,j} \\ u_{i+1,j+1} - u_{i+1,j} - u_{i,j+1} + u_{i,j} \\ v_{i+1,j+1} - v_{i+1,j} - v_{i,j+1} + v_{i,j} \end{array} \right\|^2.$$

Additionally, embodiments employ an epipolar constraint term, $E_e$, which measures the disparity in vertical matching between respective pairs of feature points 660$a$1-660$an$ and feature points 660$b$1-660$bn$ between left image 610 and right image 614. The coordinates of a matching point, are, in one embodiment, determined using linear interpolation. $E_e$ is calculated using the equation:

$$E_e = \sum_e (v_e^L - v_e^R)^2.$$

With respect to this equation, embodiments will calculate corrdinates of matching points $v_e^L$ and $v_e^R$. For example, for $v_e^L$, a corresponding mesh of this point (rectangular mesh, denoted by the mesh index by (i,j) is first obtained, making available the coordinates of four mesh vertexes $v_{i,j}^L$; $v_{i+1,j}^L$; $v_{i,j+1}^L$; $v_{i+1,j+1}^L$, and the relative position of $v_e^L$ with respect to the four vertexes, such that the calculation becomes $$v_e^L = (1-\lambda)(1-\mu)v_{i,j}^L + \lambda(1-\mu)v_{i+1,j}^L + (1-\lambda)\mu v_{i,j+1}^L + \lambda\mu v_{i+1,j+1}^L.$$

Feature points $660a1$-$660an$ and feature points $660b1$-$660bn$ are also used to calculate a constraint $E_d$ is used to reduce the shift in relative horizontal position between left image 610 and right image 614. $E_d$ is calculated using the equation:

$$E_d = \sum_d (u_d^L - Lx_d)^2 + (u_d^R - Rx_d)^2,$$

where $u_d^L$ and $u_d^R$ are obtained, in some embodiments, through a linear interpolation similar to that discussed above with respect to $v_e^L$ and $v_e^R$. In some embodiments, Lx and Rx are specified by users through a user interface.

An additional constraint, $E_a$ is a constraint on changes in the scale of an image. Scale changes, which can cause distortion, are restricted by the minimization of the $E_a$ term. $E_a$ is calculated using the equation:

$$E_a = \sum_a (u_a^R - u_a^L - X_a)^2,$$

where $u_a^L$ and $u_a^R$ are specified as the topleft and topright points of the image, thereby maintaining image width. In some embodiments, both the pair of topleft and topright points, as well as bottom-left and bottom-right points are used, and their average distance is maintained, to maintain scale.

The constraint $E_x$ measures the horizontal disparity between respective pairs of feature points $660a1$-$660an$ and feature points $660b1$-$660bn$ between left image 610 and right image 614. $E_x$ is calculated using the equation:

$$E_x = \sum_x (u_x^L - u_x^R)^2,$$

where $u_x^L$ and $u_x^R$ are obtained, in some embodiments, through a linear interpolation similar to that discussed above with respect to $v_e^L$ and $v_e^R$. Minization of the $E_x$ provides for a more profound three-dimensional visual effect.

Figure 7:
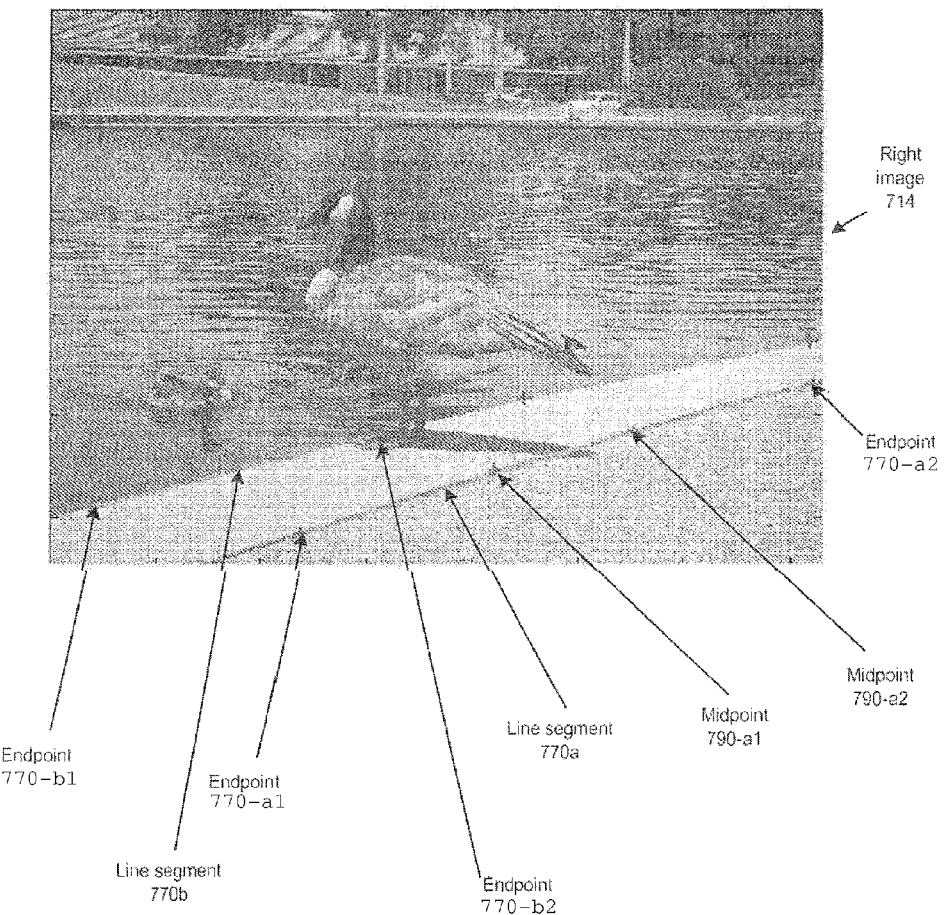
FIG. 7 illustrates results of an example of a line segment recognition operation that can be used in the context of implementing image rectification for stereo display according to some embodiments.

FIG. 7 illustrates results of an example of a line segment recognition operation that can be used in the context of implementing image rectification for stereo display according to some embodiments. Right image 714 contains a series of line segments, of which line segments 770a-b are identified. Additional line segments are shown, but their labels are omitted for clarity of discussion. Likewise, line segment identification is, in some embodiments, performed with respect to the left image, but discussion is limited to line segment identification in a single image for the sake of brevity. In some embodiments, line segments 770a-b are identified by a user as being line segments that the user desires to remain straight in resulting output images. The user identifies a line segment, such as line segment 770a by denoting endpoints 770-a1-770-a2 as well as optional midpoints 790-a1-790-a2. A line segment such as line segment 770b may be denoted merely by endpoints 770-b1-770-b2 without reference to midpoints. Alternatively, a feature identification module may identify line segments for preservation.

Constraint $E_l$ measures the degree to which line segments 770a-b would be forced to deviate from a straightness by a transformation. $E_l$ is calculated using the equation:

$$E_l = \sum_l (\sigma v_l^1 + (1-\sigma)v_l^2 - v_l^m)^2 + (\sigma u_l^1 + (1-\sigma)u_l^2 - u_l^m)^2,$$

where all
relevant points are obtained, in some embodiments, through a linear interpolation similar to that discussed above with respect to $v_e^L$ and $v_e^R$.

Figure 8:
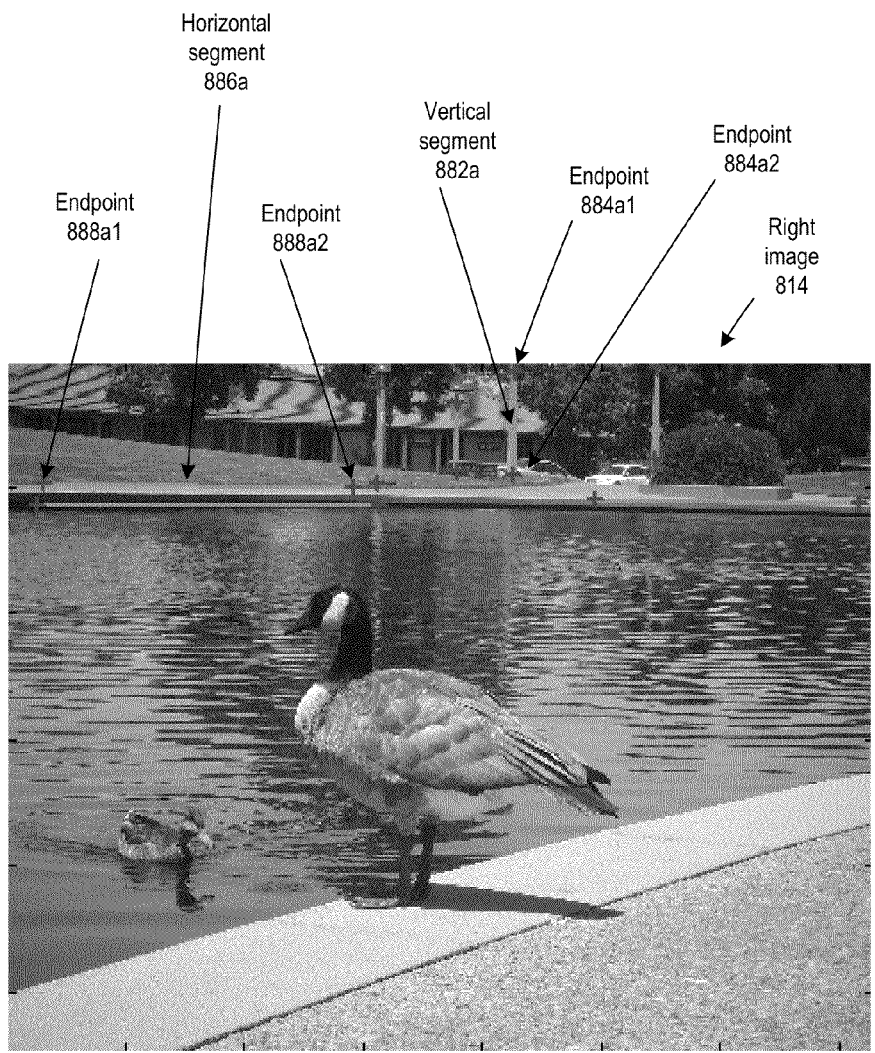
FIG. 8 depicts results of an example of a horizontal and vertical line segment recognition operation that can be used in the context of implementing image rectification for stereo display according to some embodiments.

FIG. 8 depicts results of an example of a horizontal and vertical line segment recognition operation that can be used in the context of implementing image rectification for stereo display according to some embodiments. Right image 814 contains a series of horizontal and vertical line segments, of which horizontal segment 886a is identified as being a horizontal line segment and vertical segment 882a is identified as being a vertical line segment. Additional horizontal and vertical line segments are shown, but their labels are omitted for clarity of discussion. Likewise, line segment identification is, in some embodiments, performed with respect to the left image, but discussion is limited to line segment identification in a single image for the sake of brevity. In some embodiments, horizontal segment 886a and vertical segment 882a are identified by a user as being line segments that the user desires to remain horizontal or vertical, respectively, in any resulting output images. The user identifies a horizontal line segment, such as horizontal segment 886a by denoting endpoints 888a1-888a2. The user identifies a vertical line segment, such as vertical segment 884a, by denoting endpoints 882a1-882a2.

Constraint $E_h$ measures the degree to which horizontal segment 886a and vertical segment 882a would be forced to deviate from horizontal or vertical orientation, respectively, by a transformation. $E_h$ is calculated using the equation:

$$E_h = \sum_h \tau(v_h^1 - v_h^2)^2 + (1-\tau)(u_h^1 - u_h^2)^2,$$

where all relevant points are obtained, in some embodiments, through a linear interpolation similar to that discussed above with respect to $v_e^L$ and $v_e^R$.

Figure 9A:
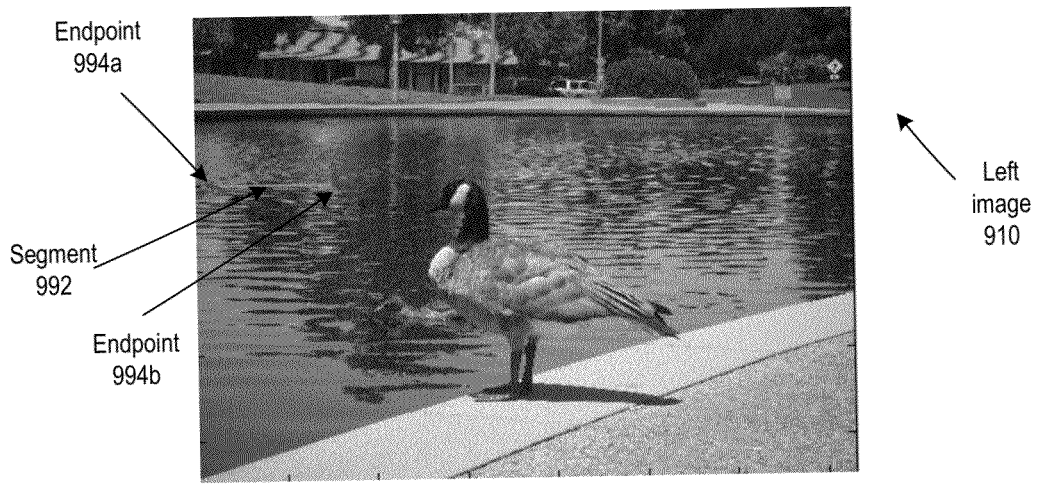
FIGS. 9A-9B illustrate results of an example of a parallel line segment recognition operation that can be used in the context of implementing image rectification for stereo display according to some embodiments.
Figure 9B:
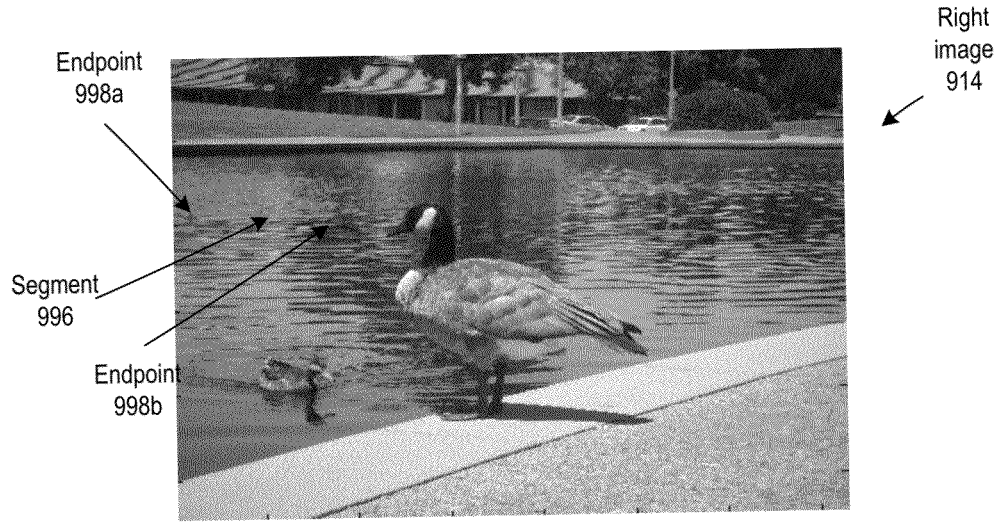

FIGS. 9A-9B illustrate results of an example of a parallel line segment recognition operation that can be used in the context of implementing image rectification for stereo display according to some embodiments. FIG. 9A contains a left image 910 with a line segment 992 defined by endpoints 994a-994b. FIG. 9B contains a corresponding right image 914 with a corresponding parallel line segment 996 defined by endpoints 998a-998b. Additional corresponding parallel line segment pairs exist in left image 910 and right image 914, but their labels are omitted for clarity of discussion. In some embodiments, pairs such as segment 992 and segment 996 are identified by a user as being line segments for which maintenance of parallel orientation is desired. In one embodiment user identifies segment 992 by denoting endpoints 994a-994b. The user identifies segment 996 by denoting endpoints 998a-998b.

Constraint $E_p$ measures the degree to which segment 992 and segment 996 would be forced to deviate from parallel orientation by a transformation. $E_p$ is calculated using the equation:

$$E_p = \sum_p ((v_2^l - v_1^l)(u_2^r - u_1^r) - (v_2^r - v_1^r)(u_2^l - u_1^l))^2,$$

where all relevant points are obtained, in some embodiments, through a linear interpolation similar to that discussed above with respect to $v_e^L$ and $v_e^R$.

Additionally, a user-specified constraint, $E_n$, may be used to constrain a user-defined polygonal region such that it is transformed as a projection of a rigid three-dimensional plane, resulting in a homgraphy. $E_h$ is calculated using the equation:

$$E_n = \sum_{i,j} \left\| \begin{bmatrix} u_{i,j} \\ v_{i,j} \end{bmatrix} - \begin{bmatrix} \dfrac{h_1 x_{i,j} + h_2 y_{i,j} + h_3}{h_7 x_{i,j} + h_8 y_{i,j} + h_9} \\ \dfrac{h_4 x_{i,j} + h_5 y_{i,j} + h_6}{h_7 x_{i,j} + h_8 y_{i,j} + h_9} \end{bmatrix} \right\|^2,$$

where the homography variables and the output coordinates are optimized by embodiments.

Application of Transformation and Finishing Steps in Image Rectification for Stereo Display Using the constraints described above as applied to the selected image pair and the data points identified above, a transformation of the base mesh for each of the right image and the left image can be calculated. In some embodiments, transformations are calculated using only constraints $E_c$, $E_s$, $E_e$, $E_d$, $E_a$, $E_x$, $E_l$, and $E_h$, which reduces the calculation to a quadratic minimization problem that can be solved by a linear solver. Some embodiments that additionally use $E_p$ and $E_n$ constraints solve for the transformation using Levenberg-Marquardt methods. In such a case, the initial value is either the uniform rectangle mesh vertexes, or the output coordinates obtained by the linear solver.

Figure 10A:
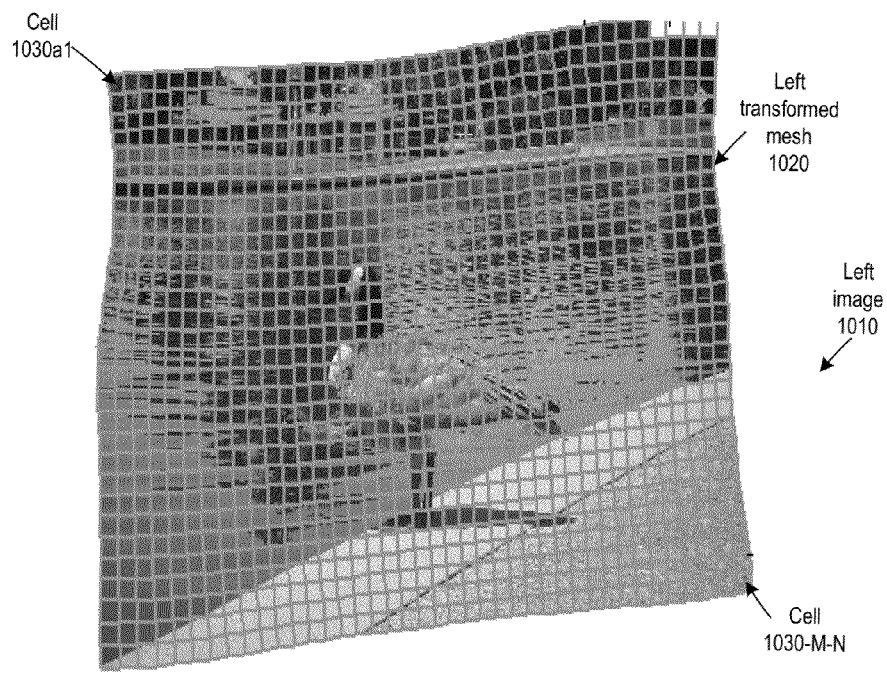
FIGS. 10A-10B illustrate results of an example mesh-based transformation operation that can be used in the context of implementing image rectification for stereo display according to some embodiments.
Figure 10B:
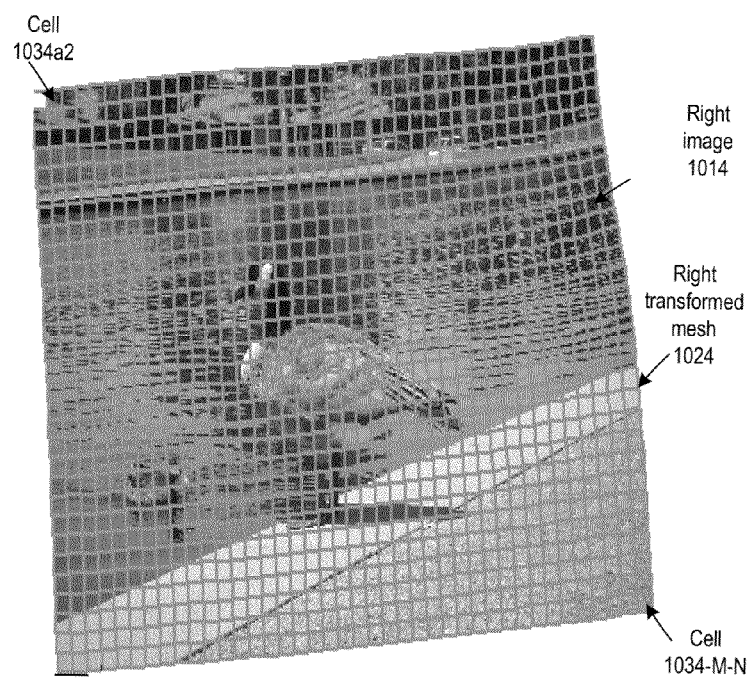

FIGS. 10A-10B illustrate results of an example mesh-based transformation operation that can be used in the context of implementing image rectification for stereo display according to some embodiments. FIG. 10A shows a left transformed mesh 1020 generated by calculating and applying a mesh transformation to a basic mesh as described above. A left image 1010 is generated by texture mapping the pixel contents of a set of cells 1030-1-1-1030-M-N to left transformed mesh 1020. FIG. 10B shows a right transformed mesh 1024 generated by calculating and applying a mesh transformation to a basic mesh as described above. A right image 1014 is generated by texture mapping the pixel contents of a set of cells 1034-1-1-1034-M-N to right transformed mesh 1024.

FIGS. 11A-11B illustrate example results of image rectification for stereo display according to some embodiments. Cropping, as well as other finishing operations that will vary from embodiment to embodiment, are performed on transformed images to generate images of matching sizes. FIG. 11A shows a left image 1110 generated by cropping and otherwise finishing a transformed image such as left image 1010 described above with respect to FIG. 10A. FIG. 11B shows a right image 1114 generated by cropping and otherwise finishing a transformed image such as right image 1014 described above with respect to FIG. 10B.

Example System

Embodiments of an image rectification module for stereo display and/or of the image rectification techniques as described herein may be executed on one or more computer systems, which may interact with various other devices. One such computer system is illustrated by FIG. 12. In different embodiments, computer system 1200 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1200 includes one or more processors 1210 coupled to a system memory 1220 via an input/output (I/O) interface 1230. Computer system 1200 further includes a network interface 1240 coupled to I/O interface 1230, and one or more input/output devices 1250, such as cursor control device 1260, keyboard 1270, and display(s) 1280. In some embodiments, it is contemplated that embodiments may be implemented using a single instance of computer system 1200, while in other embodiments multiple such systems, or multiple nodes making up computer system 1200, may be configured to host different portions or instances of embodiments. For example, in one embodiment some elements may be implemented via one or more nodes of computer system 1200 that are distinct from those nodes implementing other elements.

In various embodiments, computer system 1200 may be a uniprocessor system including one processor 1210, or a multiprocessor system including several processors 1210 (e.g., two, four, eight, or another suitable number). Processors 1210 may be any suitable processor capable of executing instructions. For example, in various embodiments, processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA.

In some embodiments, at least one processor 1210 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1220 may be configured to store program instructions and/or data accessible by processor 1210. In various embodiments, system memory 1220 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of an image rectification module are shown stored within system memory 1220 as program instructions 1225 and data storage 1235, respectively. In other embodiments, program instructions and/or data may be received, sent or stored upon different types of computer-accessible media or on similar media separate from system memory 1220 or computer system 1200. Generally speaking, a computer-accessible medium may include storage media or memory media such as magnetic or optical media, e.g., disk or CD/DVD-ROM coupled to computer system 1200 via I/O interface 1230. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1240.

In one embodiment, I/O interface 1230 may be configured to coordinate I/O traffic between processor 1210, system memory 1220, and any peripheral devices in the device, including network interface 1240 or other peripheral interfaces, such as input/output devices 1250. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. In addition, in some embodiments some or all of the functionality of I/O interface 1230, such as an interface to system memory 1220, may be incorporated directly into processor 1210.

Network interface 1240 may be configured to allow data to be exchanged between computer system 1200 and other devices attached to a network, such as other computer systems, or between nodes of computer system 1200. In various embodiments, network interface 1240 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1250 may, in some embodiments, include one or more display terminals, keyboards, keypads, touchpads, scanning devices, voice or optical recognition devices, or any other devices suitable for entering or retrieving data by one or more computer system 1200. Multiple input/output devices 1250 may be present in computer system 1200 or may be distributed on various nodes of computer system 1200.

In some embodiments, similar input/output devices may be separate from computer system 1200 and may interact with one or more nodes of computer system 1200 through a wired or wireless connection, such as over network interface 1240.

As shown in FIG. 12, memory 1220 may include program instructions 1225, configured to implement embodiments of an image rectification module as described herein, and data storage 1235, comprising various data accessible by program instructions 1225. In one embodiment, program instructions 1225 may include software elements of embodiments of a image rectification module as illustrated in the above Figures. Data storage 1235 may include data that may be used in embodiments. In other embodiments, other or different software elements and data may be included.

Those skilled in the art will appreciate that computer system 1200 is merely illustrative and is not intended to limit the scope of a image rectification module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1200 may be transmitted to computer system 1200 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
    associating a set of features in a pair of images to selected cells within a set of cells using a base mesh, wherein the associating comprises:
        dividing each image of the pair of images using the base mesh to generate the set of cells, and
        defining the set of features in terms of the selected cells; and
    generating a stereo image pair, wherein the generating the stereo image pair comprises transforming the set of cells with a mesh-based transformation function, wherein the transforming the set of cells further comprises:
        computing a transformation of the set of cells by applying an energy minimization function to the set of cells, said applying the energy minimization function including calculating for the set of cells constraint terms based on derivatives of vertexes of the set of cells; and
        generating a selected transformed mesh and another transformed mesh by applying the transformation of the set of cells to the base mesh, and
    wherein the mesh-based transformation function preserves selected properties of the set of features in the pair of images.

2. The computer-implemented method of claim 1, further comprising cropping the stereo image pair to generate an image pair rectified for stereo display.

3. The computer-implemented method of claim 1, wherein the generating the stereo image pair further comprises applying content of the set of cells to a set of transformed cells within the selected transformed mesh and the another transformed mesh.

4. The computer-implemented method of claim 1, wherein the calculating the constraint terms for the set of cells further comprises calculating for the set of cells a constraint term based on a first derivative of the vertexes of the set of cells, a constraint term based on a second derivative of the vertexes of the set of cells, and a constraint term based on an epipolar constraint.

5. The computer-implemented method of claim 1, wherein the calculating the constraint terms for the set of cells further comprises calculating for the set of cells a constraint term based on a parallel orientation of a line segment in a selected image of the stereo image pair to a line segment in another image of the stereo image pair.

6. The computer-implemented method of claim 1, wherein the associating further comprises identifying the set of features in the pair of images.

7. A system, comprising:
    at least one processor; and
    a memory comprising program instructions, wherein the program instructions are executable by the at least one processor to:
        associate a set of features in a pair of images to selected cells within a set of cells using a base mesh by:
            dividing each image of the pair of images using the base mesh to generate the set of cells, and
            defining the set of features in terms of the selected cells; and
        generate a stereo image pair by transforming the set of cells with a mesh-based transformation function, the transforming including:
            computing a transformation of the set of cells by applying an energy minimization function to the set of cells, said applying the energy minimization function including calculating for the set of cells constraint terms based on derivatives of vertexes of the set of cells; and
            generating a selected transformed mesh and another transformed mesh by applying the transformation of the set of cells to the base mesh, and
        wherein the mesh-based transformation function preserves selected properties of the set of features in the pair of images.

8. The system of claim 7, further comprising program instructions executable by the at least one processor to crop the stereo image pair to generate an image pair rectified for stereo display.

9. The system of claim 7, wherein the program instructions executable by the at least one processor to generate the stereo image pair further comprise program instructions executable by the at least one processor to apply content of the set of cells to a set of transformed cells within the selected transformed mesh and the another transformed mesh.

10. The system of claim 7, wherein the program instructions executable by the at least one processor to calculate the constraint terms for the set of cells further comprise program instructions executable by the at least one processor to calculate for the set of cells a constraint term based on a first derivative of the vertexes of the set of cells, a constraint term based on a second derivative of the vertexes of the set of cells, and a constraint term based on an epipolar constraint.

11. The system of claim 7, wherein the program instructions executable by the at least one processor to calculate the constraint terms for the set of cells further comprise program instructions executable by the at least one processor to calculate for the set of cells a constraint term based on a parallel orientation of a line segment in a selected image of the stereo image pair to a line segment in another image of the stereo image pair.

12. The system of claim 7, wherein the program instructions executable by the at least one processor to associate the set of features in the pair of images to the selected cells further comprise program instructions executable by the at least one processor to identify the set of features in the pair of images.

13. A tangible computer-readable storage device storing program instructions, wherein the program instructions are computer-executable to perform operations comprising:
    associating a set of features in a pair of images to selected cells within a set of cells using a base mesh, wherein the associating comprises:
        dividing each image of the pair of images using the base mesh to generate the set of cells, and
        defining the set of features in terms of the selected cells; and
    generating a stereo image pair, wherein the generating the stereo image pair comprises transforming the set of cells with a mesh-based transformation function, wherein the transforming the set of cells comprises:
computing a transformation of the set of cells by applying an energy minimization function to the set of cells, said applying the energy minimization function including calculating for the set of cells constraint terms based on derivatives of vertexes of the set of cells; and
generating a selected transformed mesh and another transformed mesh by applying the transformation of the set of cells to the base mesh, and
wherein the mesh-based transformation function preserves selected properties of the set of features in the pair of images.

14. The tangible computer-readable storage device of claim 13, wherein the operations further comprise cropping the stereo image pair to generate an image pair rectified for stereo display.

15. The tangible computer-readable storage device of claim 13, wherein generating the stereo image pair further comprises applying content of the set of cells to a set of transformed cells within the selected transformed mesh and the another transformed mesh.

16. The tangible computer-readable storage device of claim 13, wherein the calculating the constraint terms for the set of cells further comprises calculating for the set of cells a constraint term based on a first derivative of the vertexes of the set of cells, a constraint term based on a second derivative of the vertexes of the set of cells, and a constraint term based on an epipolar constraint.

17. The tangible computer-readable storage device of claim 13, wherein the calculating the constraint terms for the set of cells further comprises calculating for the set of cells a constraint term based on a parallel orientation of a line segment in a selected image of the stereo image pair to a line segment in another image of the stereo image pair.

18. The computer-implemented method of claim 1, wherein one or more features of the set of features are selected via user input.

19. The system of claim 7, wherein one or more features of the set of features are selected via user input.

20. The tangible computer-readable storage device of claim 13, wherein one or more features of the set of features are selected via user input.

\* \* \* \* \*